Aug. 13, 1929.                H. G. KELLOGG                1,724,601
                                 MOLDING
                            Filed Sept. 8, 1924
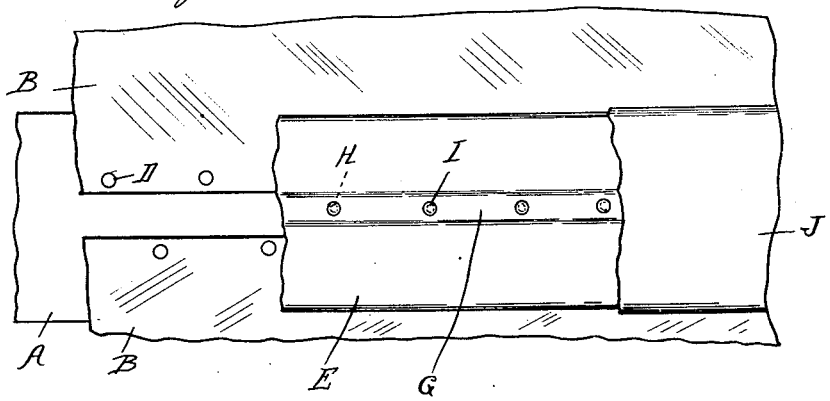
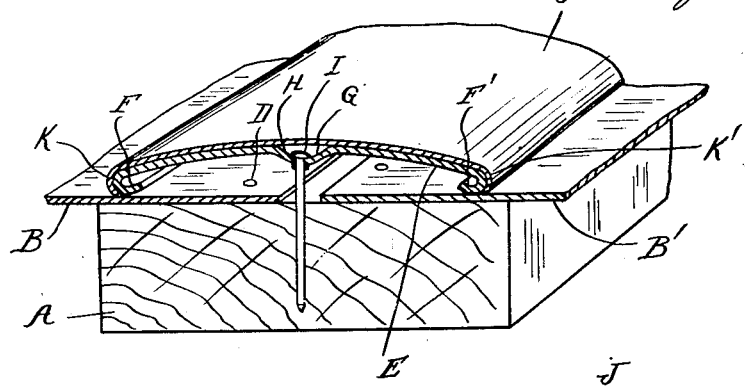
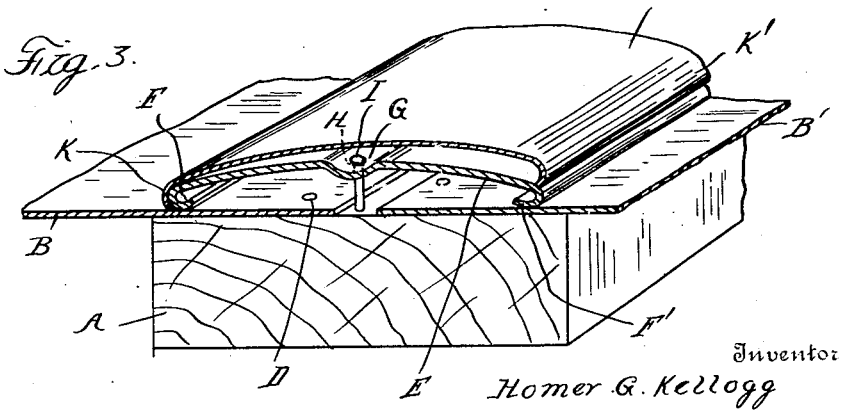
Inventor
Homer G. Kellogg
By Whittemore Hulbert Whittemore
   Belknap    Attorneys Patented Aug. 13, 1929.

1,724,601

UNITED STATES PATENT OFFICE.

HOMER G. KELLOGG, OF DETROIT, MICHIGAN, ASSIGNOR TO MOTOR PRODUCTS CORPORATION, OF DETROIT, MICHIGAN, A CORPORATION OF NEW YORK.

MOLDING.

Application filed September 8, 1924. Serial No. 736,650.

The invention relates to a construction of molding more particularly designed for use in connection with the manufacture of motor vehicle bodies. With a certain type of construction of automobile bodies the pressed metal plates or stampings are separately attached to the frame and the joint between such plates is concealed by a molding strip. It is essential that such strip should cover any space between edges of the plates, and also overlap said plates so as to conceal the nails or other fastening means. It is equally important that the strip of molding itself should be securely fastened in position without exposing the fastening means. Also where the strip has an enamel finish, marring of this finish during the securing operation must be avoided.

It is an object of the present invention to obtain a construction of molding which is adapted to be easily and securely mounted upon the body so as to completely conceal the joint between plates, and the securing means therefor.

It is a further object to avoid marring of the finish of said bead or strip and to completely conceal its own securing means. These objects are attained by the construction as hereinafter set forth.

In the drawings:

Figure 1 is an elevation showing fragments of adjacent panels secured to an automobile frame, together with a fragment of my improved molding;

Figure 2 is an enlarged sectional perspective view of the molding with the snap-on cover in position;

Figure 3 is a similar view showing the manner of engaging the snap-on cover.

As shown in Figure 1, A is one of the wooden frame members of an automobile body, and B and B' are adjacent metallic panels or stampings secured to said member. These panels, as shown, have their adjacent edges slightly spaced from each other and they are secured to the strip A by a series of nails D adjacent to the edge and suitably spaced. E is a molding strip preferably formed of sheet metal and which may be of any suitable cross-sectional contour. As specifically shown the strip is of a slightly bowed cross-section having its opposite edges return bent at F and F'. There is also provided a groove G extending longitudinally in the central portion of the strip with perforations at intervals for the passage of the nails or other securing means, thus to secure the strip it is properly placed in position so as to cover the edges of the sheets B and B' and the rows of securing nails D. The strip is then secured by nailing in the apertures H while the heads of the nails will engage the groove G so as to avoid projection above the surface of the body of the strip.

The construction as thus far described would be objectionable, first, because of the exposure of the nails or securing members I, and second, because the driving of such nails would inevitably mar an enamel finish. I have, however, provided for completely concealing the nails by a finished cover strip J. This is formed of the same general cross-sectional contour as the strip E but may be made of much lighter gauge metal as it receives its mechanical support from the inner strip. The cover J is also provided with return bent edge portions K, K' which when in full engagement with the edges F and F' will hold said cover from detachment. The material of which the cover strip J is formed has sufficient resiliency to permit the outward springing of the edge portions K, K', and thus all that is necessary to engage that cover is to snap it over the lower strip. When thus secured it will be securely held from disengagement, and as it perfectly conforms to the inner strip it will be reinforced by the latter. Also the resilient tension exerted by the edge portions of the cover is sufficient to hold the same from rattling, or from movement independent of the lower strip.

The construction described greatly facilitates the manufacture of automobile bodies for no care is required on the part of the workman to avoid marring of the inner strip E. On the other hand, the cover strip J may be provided with a high finish of enamel or other material and as it is placed in position by merely snapping over the lower strip there is no danger of injury to this finish. Furthermore, as has been already stated, the cover strip may be made of light gauge metal as its only function is to support the outer finish.

In case repairs are necessary, or for any reason if it is desired to remove the bead or strip, the cover strip J may be easily stripped off from the supporting strip E.

Such stripping operation will destroy the cover but it may be easily replaced by another cover strip when the repairs are completed. The lower strip can be detached by withdrawing the nails or other securing devices, and any marring occasioned by such operation is immaterial as it will be completely concealed by the finish cover.

What I claim as my invention is:

1. A finish bead or molding comprising an inner securing strip of predetermined cross-sectional contour, and an outer cover strip of corresponding cross-sectional contour having a snap-on engagement with said inner strip.

2. A finish bead or molding comprising an inner strip of predetermined cross-sectional contour, means for securing said strip to the structure on which it is mounted, and an outer cover strip of corresponding cross-sectional contour formed of lighter gauge material and having a snap-on engagement with said inner strip.

3. A finish bead or molding comprising a sheet metal strip of bowed cross-sectional contour and provided with return bent edge flanges, securing means for said strip and a cover strip formed of relatively light gauge material conforming to the cross-sectional contour of said inner strip with return bent flanges on its opposite edges, and having a snap-on engagement with said inner strip.

In testimony whereof I affix my signature.

HOMER G. KELLOGG.